(12) United States Patent
Quinn et al.

(10) Patent No.: US 6,196,683 B1
(45) Date of Patent: Mar. 6, 2001

(54) PEARLESCENT CONTACT LENS

(75) Inventors: Michael H. Quinn, Valparaiso, IN (US); Barry L. Atkins, Chicago, IL (US)

(73) Assignee: Wesley Jessen Corporation, Des Plaines, IL (US)

( * ) Notice: Subject to any disclaimer, the term of this patent is extended or adjusted under 35 U.S.C. 154(b) by 0 days.

(21) Appl. No.: 09/298,141

(22) Filed: Apr. 23, 1999

(51) Int. Cl.⁷ ....................................................... G02C 7/04
(52) U.S. Cl. ............................................. 351/162; 351/177
(58) Field of Search .......................... 351/106 R, 160 H, 351/161, 162, 177

(56) References Cited

U.S. PATENT DOCUMENTS

| | | | |
|---|---|---|---|
| 3,679,504 | 7/1972 | Wichterle | 156/62 |
| 4,405,773 | 9/1983 | Loshaek et al. | 526/317 |
| 4,582,402 | 4/1986 | Knapp | 351/162 |
| 4,639,105 | * 1/1987 | Neefe | 351/162 |
| 4,668,240 | 5/1987 | Loshaek | 8/507 |
| 5,034,166 | 7/1991 | Rawlings et al. | 264/1.7 |
| 5,116,112 | 5/1992 | Rawlings | 351/162 |
| 5,414,477 | 5/1995 | Jahnke | 351/162 |

* cited by examiner

Primary Examiner—Scott J. Sugarman
(74) Attorney, Agent, or Firm—Brinks Hofer Gilson & Lione

(57) ABSTRACT

A contact lens and method for making the same provides a cosmetic effect using pearlescent pigment.

37 Claims, 3 Drawing Sheets

PEARLESCENT CONTACT LENS

FIELD OF THE INVENTION

This invention relates to contact lens manufacture, the lenses made thereby, and more particularly to a contact lens which produces a cosmetic effect.

BACKGROUND OF THE INVENTION

Contact lenses which yield a cosmetic effect, i.e., a change in the visual appearance of the wearer's eye, are well known and have been available commercially for many years. The principal object of many of these lenses is to improve the color of the iris or its texture. The appearance of an iris is relatively complex, showing multiple colors and textures (collectively referred to herein simply as "color", as in a "colored contact lens"). See, for example, Jahnke, U.S. Pat. No. 5,414,477. The appearance of the natural iris is not a simple solid color, but a structure comprising many lines and different colors. Some cosmetic lens wearers prefer a colored contact lens that duplicates this natural complexity. For these wearers, the more natural their eyes appear with the lens, the more appealing they find the cosmetic effect of the lens. Other cosmetic contact lens wearers are interested in a more striking eye change, and the contact lens patterns and colors that these customers prefer may deviate from a common natural looking eye in order to make their eyes more distinct. The more a contact lens can duplicate this complexity, the more appealing it is considered to be as a consumer product.

Colored contact lenses are commonly made in two ways. One is by bonding, or entrapping, a dye to a lens, such as diazo, triazo, or vat dyes, which permeate the lens. This method is considered limiting because only non-opaque dyes can be used. The resulting contact lens will be colored, but the entire lens still transmits significant amounts of light through the part of the lens covering the iris. This tends to produce generally subtle color changes, which reduces the utility of the lens to effect a cosmetic change with dark colored eyes, for instance.

Opaque lenses may be produced using vat, diazo or triazo dyes by first soaking a hydrophilic lens in a BaCl solution, removing the lens from the BaCl solution, soaking the lens in an $H_2SO_4$ solution so that the barium precipitates with the sulfate ion to form $BaSO_4$. Thereafter, the application of the vat, diazo or triazo dyes can produce an opaque color. This process, however, is extremely time consuming, involves many steps, and is difficult to scale.

The other common method for making a colored contact lens is by printing an ink-containing pigment (or pigments) to the surface of the lens. This can be by printing the ink directly on the surface of the lens, or on a casting cup which then transfers the printing to the lens. Printing is also considered somewhat limited due to the types of pigments that have been used to date. These pigments absorb and reflect light to give a cosmetic effect. Texture, for instance, is achieved by choosing the pattern(s) in which the ink is applied to the lens surface, and the number of ink colors applied. Current technology relies upon pigments that have limited or no characteristics other than direct absorption or reflection of light. There has been a continuing effort in the industry to improve colored contact lenses by printing pigments on the lens that give the cosmetic appearance that many consumers want, and attempting to achieve cosmetic effects that may have appeal such as a perception of depth, and unusual textural effects.

SUMMARY OF THE INVENTION

It is a principal objective of this invention to provide an improved contact lens through the addition of a pearlescent material to the contact lens to change the cosmetic appearance of the iris. The pearlescent material can be in the form of an ink or inks applied to the contact lens, using techniques developed for application of conventional pigments. The pearlescent ink (or pearlescent pigment) can be used alone or with conventional pigments to make colored contact lenses with superior cosmetic properties. What the inventors have discerned already is that colored contact lenses made in accordance with the invention impart textures to the eye that cannot be duplicated through the use of conventional (i.e., non-pearlescent) pigments alone.

One aspect of the invention thus comprises a contact lens in the form of a lens blank with a pearlescent material added to the blank, or button. More particularly, the pearlescent material is situated in an area of the contact lens which overlies a wearer's iris. The pearlescent material may be formed integral with the lens blank, e.g., dispersed throughout the blank or the portion of the blank ultimately overlying the iris, or printed upon the lens surface. The pearlescent material can further be used in conjunction with non-pearlescent pigment(s). In one aspect, the invention is a contact lens comprising a zone of pearlescent pigment and a zone of non-pearlescent pigment. Lathe-formed lenses made from buttons, or one-sided molded lenses (wherein one side of the lens is molded and the other side is lathed) are also contemplated within the invention's scope.

In another respect, the invention encompasses a contact lens comprising a substantially transparent pupil section, an iris section surrounding the pupil section, and a colored pattern over the iris section, wherein the colored pattern is comprised of pearlescent material.

The invention further encompasses a method for making a contact lens, comprising the steps of providing a transparent contact lens, and applying a pearlescent material colorant to the surface of the contact lens. The pearlescent material can be applied alone, or as noted above, in combination with other pigments.

The inventive method further includes making a contact lens wherein a contact lens blank material is provided, and a pearlescent material is added to the contact lens blank material in an amount to change the cosmetic appearance of the a contact lens made from the blank material.

The invention, its features and its advantages will be further understood upon consideration of the following detailed description of various embodiments of the invention taken in conjunction with the drawing.

DETAILED DESCRIPTION OF EMBODIMENTS OF THE INVENTION

In general, the invention in its broadest sense is the addition of a pearlescent material, e.g., a pigment, to a contact lens precursor, e.g., a blank, button, rod, mixture, etc., or to the contact lens itself as through a printing process. The pearlescent material is added in an effective amount to yield a cosmetic effect, as will be further described below. The pearlescent pigments are added either alone as the sole pigment, or in combination with other conventional pigment (s), whether mixed with the latter or as a discrete coating/ layer in combination with a separate coating/layer of the conventional pigment(s). Non-pearlescent pigments are, for example, listed in 21 CFR Part 73 Subpart D and 21 CFR Part 74 Subpart D.

Figure 2:
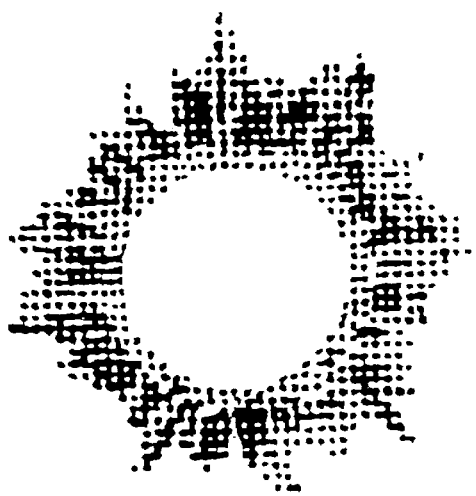
FIG. 2 illustrates a dot pattern of an inside portion of dots in accordance with the invention.
Figure 3:
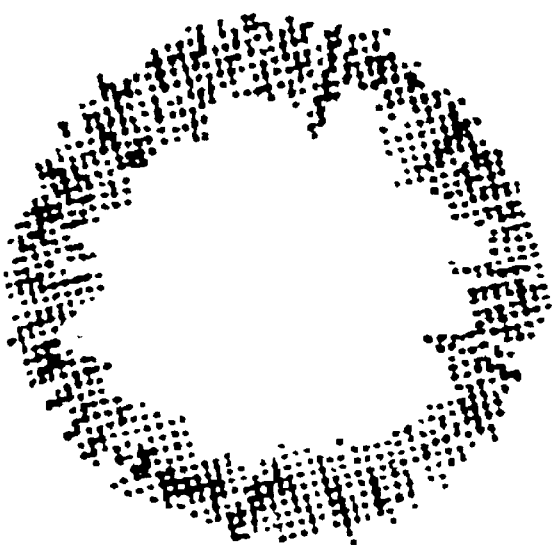
FIG. 3 illustrates a dot pattern of an outside portion of dots in accordance with the invention.
Figure 4:
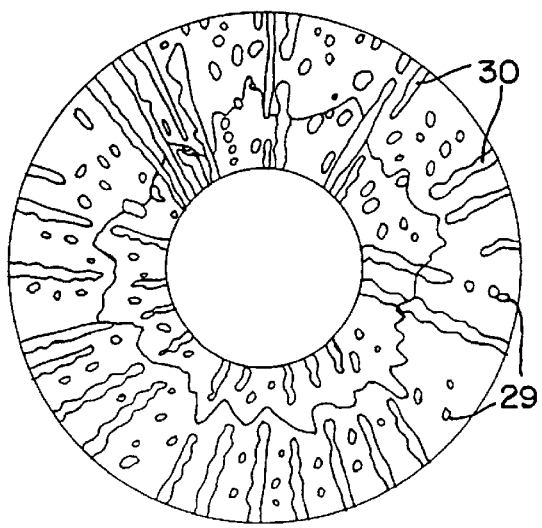
FIG. 4 illustrates an alternative embodiment of iris pattern.
Figure 5:
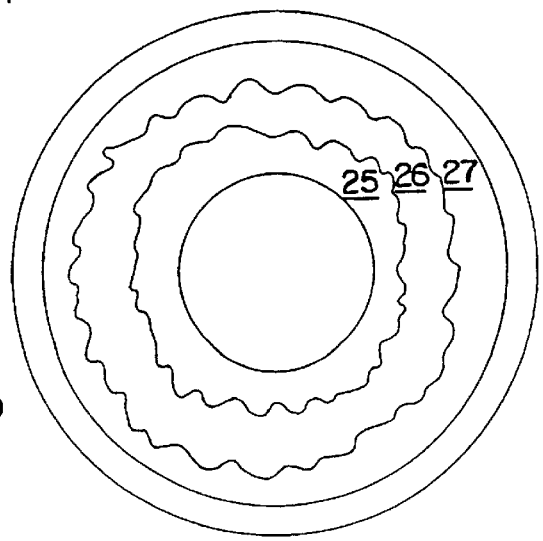
FIG. 5 illustrates a further alternative embodiment of iris pattern.

The design of a cosmetic lens involves choosing patterns and colors in order to achieve the desired cosmetic effect. The patterns are comprised of zones, and the zones may be comprised of shaped pigmented areas within the zones. The shaped areas may be further comprised of dots. Examples of zones include: a single annular iris color zone with irregular inner and outer borders; multiple concentric annular zones (e.g., FIG. 5); annular zones with outer and inner starbursts (e.g., FIGS. 2 and 3); and a single iris zone but irregular in structure along multiple radial lines. Examples of shaped pigmented areas within zones include (e.g., FIG. 4) circular areas 29, ovular areas, irregular elongated regions 30 in worm-like shapes, radial segments, and combinations of these shapes. Areas having pearlescent pigment(s) may be printed in combination with areas of non-pearlescent pigments on the same lens. The printing may be performed such that the pigmented shaped areas are closely inter-dispersed with pearlescent and non-pearlescent pigments. Alternatively, there may be distinct pearlescent and non-pearlescent regions. For example, some of the zones within the lens may be printed with pearlescent pigments 25 (FIG. 5), while other zones may be printed with non-pearlescent pigments 26. Also, one or more of the zones may be printed with inter-dispersed pearlescent and non-pearlescent pigments 27. The zones may further be comprised of pigmented shaped areas; some of the pigmented shaped areas within the zones may be printed with pearlescent pigments, while other pigmented shaped areas may be printed with non-pearlescent pigments.

In one such example, a colored contact lens may have a pattern of several annular zones, the zones being the same or similar in appearance to the zones described in heretofore mentioned U.S. Pat. No. 5,414,477. One such zone may be printed with pearlescent pigment, and one or more of the other zones may be printed with non-pearlescent pigments. Similarly, any or all zones may contain both pearlescent and non-pearlescent pigments. The annular zones, as well as the areas of pearlescent and/or non-pearlescent pigments, may be overlapping or non-overlapping. The '477 patent is also particularly useful for its disclosure of various shapes (i.e., dots (FIGS. 2 and 3), irregular regions and elongated shapes (FIG. 4)) that the pigments can be applied in.

One pearlescent pigment that has been considered applicable is in the form of a coating material such as titanium dioxide over mica platelets. The titanium dioxide coating may also contain a conventional colorant pigment. The coated mica platelets are transparent, and reflect light due to their smooth surfaces and relatively high indices of refraction. The platelets further tend to form multiple layers in the coating, imparting an enhanced color and luster at various depths through the foregoing reflection and refraction.

Pearlescent pigments which are iridescent are also considered to be particularly applicable. These pigments, through the light interference patterns they yield, often provide "color" without the need for any added conventional non-pearlescent pigment. In addition, certain such iridescent-type pigments have the ability to provide a metallic foil looking appearance to the contact lens.

Pearlescent pigments described herein are titanium dioxide with mica platelets, sold by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Georgia, the pigments having the trade name "Flonac Lustre Colors"; and EM Industries, Inc. of Hawthorne, N.Y., the pigments having the trade name "Affair Lustre Pigments".

As used herein, an effective amount of the pearlescent material is considered to be enough to achieve a cosmetic effect, which is typically in the range of about .10 to about 100 micrograms per lens. This can of course vary depending upon the desired cosmetic effect, which may range from enhancing the natural color of an eye to a complete change in both the color and pattern of an eye.

A preferred method for making a contact lens in accordance with this invention is through printing. In one such contemplated printing process, the pearlescent pigment is added to a conventional polymeric binder, solvent and bonding agent (such as hexamethylene diisocyanate). See, for instance, Knapp, U.S. Pat. No. 4,582,402; Loshaek, U.S. Pat. No. 4,668,240 and the aforementioned Jahnke U.S. Pat. No. 5,414,477 as to conventional materials and printing processes.

Printing the lens using the known printing process of U.S. Pat. No. 4,582,402 to Knapp, incorporated herein by reference, and the known printing process of U.S. Pat. Nos. 5,034,166 and 5,116,112 to Rawlings, incorporated herein by reference, is generally as follows. A plate or cliche having depressions in the desired pattern is smeared with ink of the desired shade. Excess ink is removed by scrapping the surface of the plate with a doctor blade leaving the depression filled with ink. A silicon rubber pad is pressed against the plate to pick up the ink from the depressions and then is pressed against a surface of the lens to transfer the pattern to the lens. The printed pattern is then cured to render it unremovable from the lens. Of course, either the anterior or posterior surfaces of the lens may be printed, but printing the anterior surface is presently preferred. Specifically, according to U.S. Pat. No. 5,116,112, a molded contact lens containing a transparent central visual region circumscribed by a colored iris portion is made by the process which comprises (a) coating a colored liquid which is either thermosetting or thermoplastic in a mold for making a contact lens onto a surface thereof where the iris portion of the lens is formed to produce a colored film providing a pattern thereon which film contains a surface exposed to the interior of the mold and a surface in contact with the mold; and (b) charging the mold with the lens-forming liquid used to form the body of the lens while maintaining the colored film in the iris portion and configuring the lens-forming liquid about the colored film whereby surface of the film becomes integral with the body of the lens and surface of the film becomes part of the outer surface of the lens when the molded lens is removed from the mold.

The preferred lenses used to practice this invention are known and described in Loshaek's U.S. Pat. No. 4,668,240, incorporated herein by reference. Very briefly, a lens constructed of polymer having —COOH, —OH, or —NH$_2$ groups is printed with ink containing binding polymer as described above. First a solution of binding polymer and solvent is prepared and this solution is mixed with paste containing the coloring substance to form an ink. The preferred binding polymer solutions described in the Loshaek patent have a viscosity of 25,000 CPS. It is currently preferred to form inks for the present lenses from binding polymer solutions having a viscosity of about 40,000 CPS. The opaque ink is printed and cured on the lens surface.

Of course, alternative ways to form colored opaque elements of the lens may be used. For example, selected portions of the iris section of a wetted hydrophilic lens may be impregnated with a solution of a first substance, such as barium chloride. Then the lens may be immersed in a solution of a second substance, such as sulfuric acid, that forms an opaque, water-insoluble precipitate with the first substance, for example barium sulfate. Thus, an opaque precipitate forms within the lens in a predetermined pattern in the iris section. Next all or at least the pattern of the iris section is applied by soaking the lens in a dye solution, photocuring with a mesh having the desired pattern, and washing the lens. If the entire iris is colored with translucent tint, then the interstices within the pattern will be translucently colored, but still non-opaque.

If the lens is constructed of a hydrophilic material, it also has a peripheral section surrounding iris section. For hydrophilic material, the steps described below are performed with the material in an unhydrated state. Preferred hydrophilic materials are disclosed by Loshaek in U.S. Pat. No. 4,405,773, incorporated herein by reference.

The colored pattern may be deposited onto iris section of the lens in any manner. The currently preferred method is by offset pad printing, described below in some detail.

A plate (not shown) is prepared having flat surface and circular depressions corresponding to the desired dot pattern. To make the pattern shown in FIG. 1, each depression should have a diameter with a range of about 0.05 to about 0.15 mm, preferably 0.10 mm, and a depth preferably in the range of about 0.010 to about 0.030 mm., and most preferably about 0.013 mm. The depressions are arranged to cover an annular shape corresponding to that of the iris section of the lens.

The plate may be made by a technique that is well known for making integrated analog or digital circuits. First a pattern about 20 times as large as the desired pattern is prepared. Next the pattern is reduced to the required size using well-known photographic techniques to a pattern of the exact desired size. A flat metal surface is covered by a photo resist material which becomes water insoluble when exposed to light. The photo resist material is covered with the pattern and exposed to light. The unnecessary portion of the photo resist pattern is removed by washing with water and the metal plate is etched at the portions not exposed to light to the required depth. Then the remainder of the photoresist material is mechanically removed after the etching process.

Colorant, including the pearlescent material, comprising a pigment and binder or carrier for the pigment is deposited on the flat surface of the plate and scraped across the pattern with a doctor blade. This causes depressions to be filled with ink while removing excess ink from the flat surface. The colorant may be more or less opaque depending on the degree of color change desired. The opacity may be varied by modifying the proportion of pigment to binder in the colorant. It will be recognized that a desired effect may be obtained using a highly opaque colorant (again, with the pearlescent pigment) or by having a somewhat less opaque colorant and covering a greater portion of the iris section surface. As the description hereafter further describes, however, the pearlescent pigment need not be printed on the lens simultaneously (i.e., mixed) with a non-pearlescent colorant, or printed with an additional colorant at all.

A pad made of silicon rubber, impregnated with silicon oil for easy release, is pressed against the pattern, removing ink from depressions. The ink on the pad is allowed to dry slightly as needed to improve tackiness, then pressed against the front surface of the contact lens, depositing the ink in the desired pattern over the iris section. Of course the pad must have enough flexibility to deform to fit over the convex front surface of the lens. The printing could be done in the concave surface of the lens by modifying the shape of the pad and placement of the lens. For a more natural effect, the printing step may be repeated one or more times using different patterns in different colors, since upon close examination, the irises of many persons are found to contain more than one color. The printed pattern need not be absolutely uniform, allowing for enhancement of the fine structure of the iris. A more natural appearance may be obtained by printing on both the concave and convex sides of the lens.

Next the deposited pattern is treated to render it resistant to removal from the lens under exposure to the ocular fluids that the lens will encounter when placed in the eye and when lens cleaning takes place. The exact method of preventing removal depends on the material of construction of the lens and the pattern. Mere air drying or heating the lens may suffice. For hydrophilic lenses, the techniques for coating the opaque pattern described in Wichterle, U.S. Pat. No. 3,679,504 (incorporated herein by reference), may be used.

Figure 6:
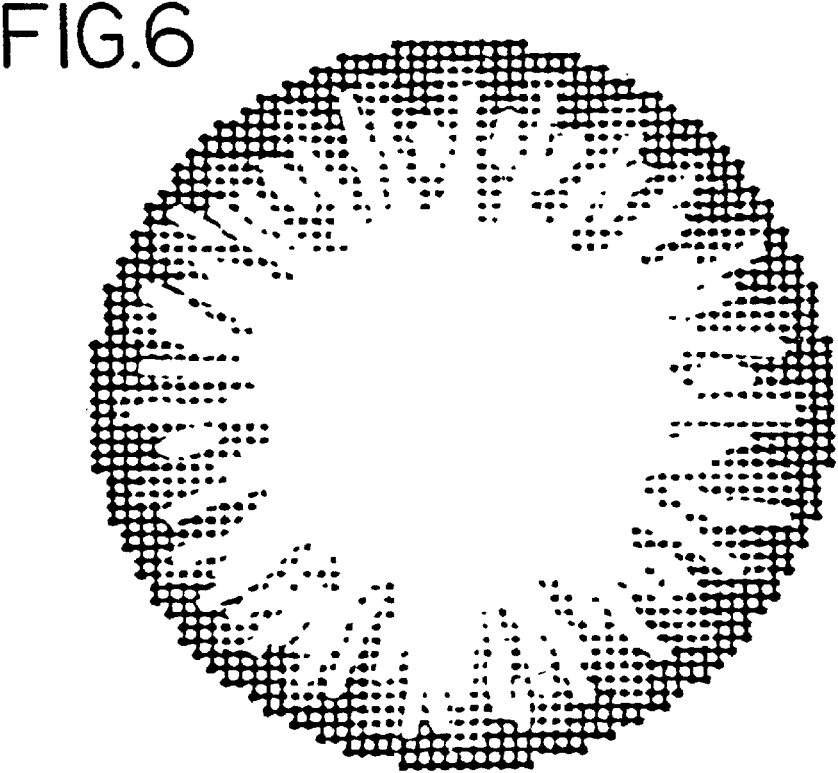
FIG. 6 illustrates a dot pattern of an outermost starburst pattern of dots in accordance with the invention.
Figure 7:
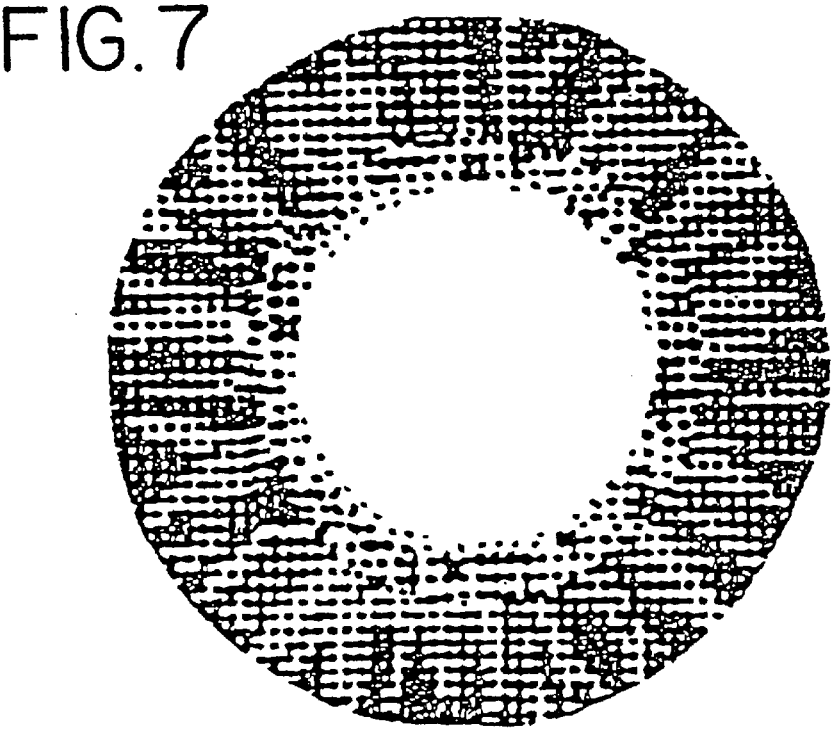
FIG. 7 illustrates a dot pattern of an outer starburst pattern of dots in accordance with the invention.

Another method of applying the pearlescent pigment may include the steps of applying three portions of colorant/pearlescent pigment to the surface of a transparent contact lens. The first portion of colorant/pearlescent pigment, or outermost starburst, is of a first shade, which may have a pattern similar to FIG. 6 for example. The second portion of colorant/pearlescent pigment, the outer starburst, which may have a pattern similar to FIG. 7 for example, is a second shade. The third portion, or the inner starburst, which may have a pattern similar to FIG. 2 for example, is a third shade. The outermost starburst will be located generally on the outside of the outer starburst, the outer starburst will be located generally on the outside of the inner starburst, and a first uneven border will differentiate the outermost starburst and a second uneven border will differentiate the outer starburst and the inner starburst, thereby providing a lens capable of making a subtle change or enhancement to the iris of a person wearing the lens while imparting a very natural appearance.

The steps used in order to deposit the intermittent pattern on the lens surface include using a first plate having depressions corresponding to the first portion or outermost starburst and filling the depressions with the first shade. Then, pressing a first flexible pad against the first plate and subsequently pressing the first flexible pad against the surface of the lens (either side) thereby printing the first portion of the elements.

Using a second plate having depressions corresponding to the second portion or outer starburst, the depressions are filled in with the second shade. Next, the second flexible pad is pressed against a second plate, followed by pressing the second flexible pad against the surface of the lens (either the same or the opposite surface) thereby printing the second portion of the elements.

Finally, using a third plate having depressions corresponding to the third portion or inner starburst and filling the depressions with the third shade. Pressing a third flexible pad against the third plate and pressing the third flexible pad against said surface of the lens (either side) thereby prints the third portion of the elements. In order to achieve the effect of naturalness, a proffered embodiment is to print the outer starburst (FIG. 7) first, the inner starburst (FIG. 2) second, and the outermost starburst (FIG. 6) last.

By using a plurality of printing steps, similar to those described above, it can be readily understood that zones and shaped areas containing various proportions of pearlescent pigments may be printed in either an overlapped or non-overlapped manner in order to achieve an intended effect.

Although the steps listed above put an order to the printing of the portions on the lens, the order of printing may vary depending upon the intended cosmetic effect, and any other appropriate order of printing could be used in the present invention. Also, only one of the three portions need contain a pearlescent pigment.

The following examples are illustrative.

Example 1

A paste was formulated by mixing 20% by weight of Mearlin Micro Violet pigment (2.63 grams) with 80% enhancing blue paste containing PCN blue pigment (10.43 grams). In a separate mixture, an effective amount of hexamethylene diisocyanate was mixed with HEMA. This mixture of hexamethylene diisocyanate and HEMA is referred to as the "activation solution". An amount of 3.52 grams of this activation solution was then added to the paste described above to produce an ink (the mixture of the paste and the activation solution).

Figure 1:
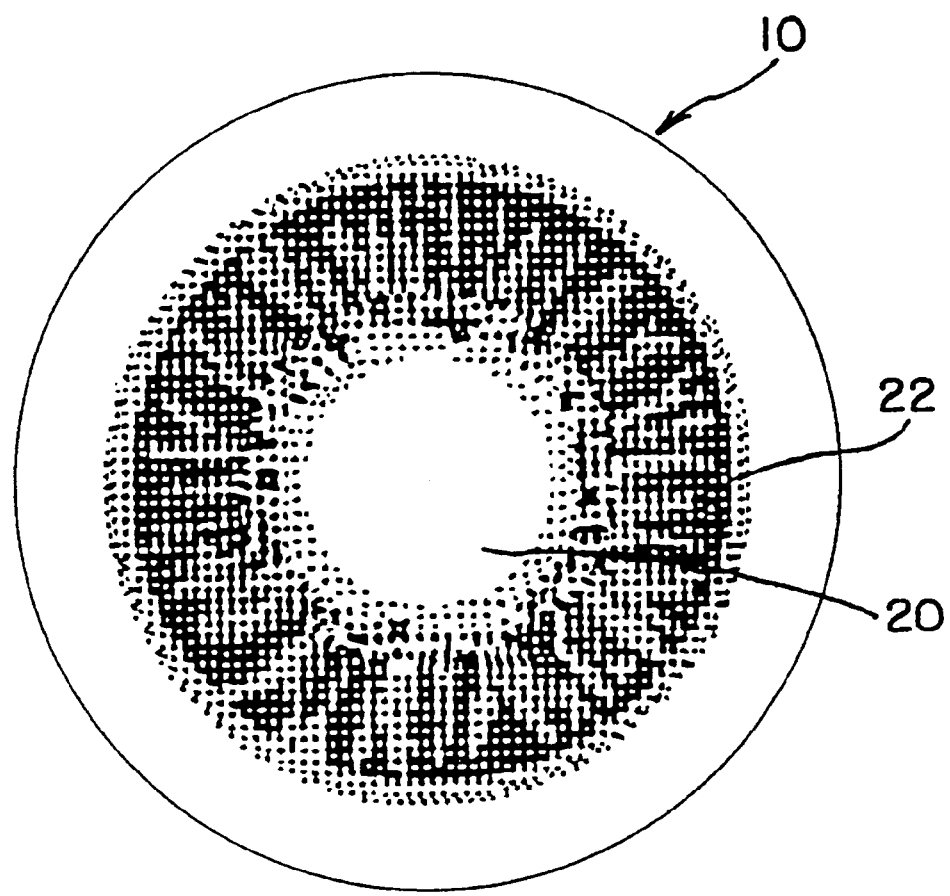
FIG. 1 is a front view of a contact lens made in accordance with the invention.

The ink was then filled into the depression of a cliche having the pattern of FIG. 1, the top surface of the cliche& was swept ("doctored") with a flat blade, and the ink left in the depression was transferred onto a silicone printing pad. The silicone pad was then applied to the anterior (convex) surface of a cast molded unhydrated hydrophilic lens. The lens to which the ink was applied was situated on the male portion of the mold, wherein the female portion of the mold was removed to expose the convex surface of the lens.

A heat print cure was then performed for 45 minutes at 85° Celsius. The lens was removed from the mold and hydrated, using hydration solution comprised primarily of purified water. The lens was transferred into a packaging solution comprised primarily of purified water and a borate buffer.

The amount of area covered by the printing that is needed to have a color enhancing effect, or a color or pattern changing effect, will depend on the ink used. The color and pattern of the iris can be changed if a lens is coated a minimum of 27% by area with the mixture of Example 1. An enhancing effect can be obtained with a minimum coverage of approximately 8% by area.

Example 2

A paste was produced by mixing 20% (by weight) Mearlin Bronze pigment (2.05 grams) with 80% enhancing clear paste (8.13 grams), plus an effective amount of activation solution (2.72 grams). A lens was printed, hydrated, and cured according to the procedure described in Example 1.

The color and pattern of the iris can be changed if a lens is coated with a minimum of 25% by area with the mixture of Example 2. An enhancing effect can be obtained with a minimum of approximately 5% by area.

As shown in FIG. 1, the contact lens 10 is depicted with the pearlescent pigmented printed layer 22 over an area of the contact lens which would overlie the iris of the wearer, and preferably all of the iris. The pupil area is generally indicated at 20.

The printing may be in a non-continuous pattern, which then allows some of the natural color of the iris to be visible through uncoated or lightly coated sections of the lens. The resulting lens has a cosmetic appearance, depending upon the pigment chosen, that can more closely simulate the natural appearance of the iris. As will further be recognized, printing of a mixture containing the pearlescent material can be on top of an already existing conventional pattern, such as with overlying dots, or with dots of the pattern being generally side-by-side.

In another application, the pearlescent pigment is combined with conventional non-pearlescent pigments, again being printed on the surface of the lens in a conventional fashion. This could be done by mixing the pearlescent pigment with colored paste printed on a clear lens. The cosmetic appearance of the conventional pigment is enhanced by the presence of the pearlescent pigment, yielding a deeper, richer appearance than could be achieved with either kind of pigment alone.

In yet another application, the pearlescent pigment is applied as a coating or print layer over a previously formed layer of a conventional non-pearlescent pigment. The latter could be dispersed throughout the lens material, or in a printing layer. The multiple printing layers are applied in a manner described in the '477 patent, for instance.

Yet another application of the invention has the pearlescent pigment added to a conventional monomer mixture used to make contact lenses. Such a monomer mixture is described in Loshaek U.S. Pat. No. 4,405,773. An effective amount of the pearlescent pigment is uniformly dispersed within the monomer. The contact lens made from the monomer blank material then has the cosmetic properties this invention provides.

The invention also has a non-cosmetic application. One advantage achieved through the addition of the pearlescent material may simply be to yield a handling tint to the lens ultimately formed from the blank material. This can be done by mixing a small amount of pearlescent pigment with a monomer mixture to produce a material that can then be added to the lens monomer solution. The handling tint enables the user to find the contact lens, such as in an aqueous solution.

Thus, while the invention has been described with reference to particular embodiments, those of skill in the art will recognize modification of structure, materials, procedure and the like that will still fall within the scope of the invention and the following claims.

What is claimed is:

1. An improved contact lens wherein the improvement comprises the printing of an effective amount of a pearlescent material on a contact lens to change the cosmetic appearance of the lens.

2. A contact lens comprising:
 a) a contact lens blank;
 b) a pearlescent material printed on said blank.

3. The contact lens of claim 2 wherein said pearlescent material is situated in an area of said contact lens blank which overlies a wearer's iris.

4. The contact lens of claim 3 wherein said pearlescent material is printed in a non-continuous pattern that permits the natural color of the iris to be visible through the contact lens.

5. The contact lens of claim 1 further including a non-pearlescent pigment printed on said blank.

6. The contact lens of claim 5 wherein said non-pearlescent pigment comprises a first printing layer on said contact lens blank, and said pearlescent material comprises an overprint on said first printing layer.

7. The contact lens of claim 2 wherein the pearlescent material comprises platelets.

8. A method for making a contact lens comprising:

a) providing a transparent contact lens, and b) applying a pearlescent material colorant to the surface of said contact lens.

9. The method of claim 8 wherein said step of applying is restricted to an area generally overlying the iris of a wearer's eye.

10. The method of claim 9 wherein said pearlescent material colorant is discontinuous over said area to permit visualization of the natural color of the wearer's iris.

11. The method of claim 9 further including printing a non-pearlescent pigment on said contact lens.

12. The method of claim 11 wherein said non-pearlescent material pigment is printed on said contact lens before said step of applying a pearlescent material colorant.

13. The method of claim 8 wherein the step of applying a pearlescent material colorant comprises:

a) providing a plate having depressions corresponding to a pattern;

b) filling the depressions with the colorant containing a pearlescent material;

c) pressing a flexible pad against the plate; and d) pressing the flexible pad against the surface of the lens.

14. The method of claim 8 wherein the step of applying a pearlescent material colorant comprises:

a) providing a plurality of plates, each plate having depressions corresponding to a unique colored pattern;

b) filling the depressions of each plate with a colorant, one or more of said plates being filled with the colorant containing a pearlescent material;

c) pressing a plurality of flexible pads against the plates, wherein a different flexible pad is pressed against each plate;

d) pressing each of the flexible pads against the surface of the lens; whereby the colored patterns are printed onto the lens.

15. A contact lens comprising a zone of pearlescent pigment printed on the lens, and a zone of non-pearlescent pigment wherein the non-pearlescent pigment is either dispersed in the lens or printed on the lens.

16. The contact lens of claim 15 wherein said zones are segregated from each other.

17. The contact lens of claim 15 wherein said zones are interspersed.

18. The contact lens of claim 15 wherein said zones overlap.

19. The contact lens of claim 15 wherein at least one of said zones is comprised of dots.

20. The contact lens of claim 15 wherein at least one of said zones is comprised of radially extending elongated shapes of a respective pigment.

21. The contact lens of claim 15 wherein the pearlescent pigment comprises platelets.

22. A contact lens comprising a substantially transparent pupil section, an iris section surrounding said pupil section, and a colored pattern over the iris section, wherein the colored pattern is comprised of pearlescent material printed on the lens.

23. The contact lens of claim 22 wherein said colored pattern comprises an effective amount of said pearlescent material so as to change the cosmetic appearance of the iris of a person wearing the lens.

24. The contact lens of claim 22 wherein the contact lens is hydrophilic.

25. The contact lens of claim 23 wherein the amount of said pearlescent material enhances the natural color of the iris of a person wearing the lens.

26. The contact lens of claim 23 wherein the amount of said pearlescent material substantially changes the color of the iris of a person wearing the lens.

27. The contact lens of claim 23 wherein the amount of said pearlescent material substantially changes the natural pattern of the iris of a person wearing the lens.

28. The contact lens of claim 23 wherein said colored pattern is non-continuous and permits the natural color of the iris to be visible through the contact lens.

29. The contact lens of claim 23 wherein said colored pattern is comprised of dots.

30. The contact lens of claim 23 wherein said lens comprises pearlescent and non-pearlescent colored material.

31. The contact lens of claim 23 wherein the colored pattern is comprised of one or more zones.

32. The contact lens of claim 31 wherein the zones are comprised of dots.

33. The contact lens of claim 31 wherein the zones are comprised of shaped pigmented areas.

34. The contact lens of claim 33 wherein the shaped areas are comprised of dots.

35. A method of making a pearlescent contact lens, comprising:

a) printing a pearlescent pigment onto a surface of a mold for making a contact lens, where the iris portion of the lens is formed, to produce a pearlescent film providing a pattern thereon, which film contains a first surface exposed to the interior of the mold and a second surface in contact with the mold; and b) charging the mold with the lens-forming liquid used to form the body of the lens while maintaining the pearlescent film in the iris portion and configuring the lens-forming liquid about the pearlescent film whereby the first surface of the film becomes integral with the body of the lens and second surface of the film becomes part of the outer surface of the lens when the molded lens is removed from the mold.

36. The method of claim 35 wherein the pearlescent pigment comprises platelets.

37. A contact lens produced by the process of claim 35.

* * * * *